July 26, 1960 E. C. SHAW 2,946,450
LIQUID FILTERS
Filed Sept. 4, 1957

Inventor
Ernest C. Shaw.
By Mann, Brown and McWilliams,
Attys.

United States Patent Office 2,946,450
Patented July 26, 1960

---

2,946,450

LIQUID FILTERS

Ernest C. Shaw, 2024 Collett Lane, Flossmoor, Ill.

Filed Sept. 4, 1957, Ser. No. 681,924

8 Claims. (Cl. 210—484)

---

This application is a continuation-in-part of my copending application Serial No. 678,297, filed August 15, 1957.

This invention relates to oil or liquid filters and particularly to such filters in which a foraminous outlet tube within a filter shell has a sleeve of filter material surrounding the tube to serve as the filtering media.

In filters of the aforesaid type the filter sleeve may be composed of fibers such as knitted material, threads, linters, paper or the like, or of combinations thereof, and the usual practice is to provide filter cartridges comprising a foraminous metal tube with the sleeve of filtering material in surrounding relation so that a cartridge may be readily replaced by clamping the new cartridge in position in the filter shell between the outlet and the removable cover of the shell.

In practice it has been found that the filter media is often bypassed due to loosening or endwise displacement of the ends of the filter sleeve, and efforts have been made to avoid this as by stiffening the fibrous filter sleeve by impregnation thereof with a stiffening material. This, however, tends to unduly restrict flow through the filter.

In view of the foregoing it is the primary object of this invention to effectually prevent bypassing of the filtering media in such filters, and related objects are to accomplish this in a simple manner, and in such a way that the filter media may be applied soft or unimpregnated so as to assure proper liquid flow.

Another object of the invention is to provide a filter cartridge that cooperates in a novel manner with the filter shell to effectually seal the ends of the fibrous filter sleeve so as to prevent bypassing of the sleeve, and a related object is to provide such a filter cartridge in which the ends of the filter sleeve are clamped and sealed against parts of the filter shell and the filter core so as to prevent endwise shortening or displacement of the filter sleeve. More specifically it is an object of this invention to accomplish such end sealing of the filter sleeve in such a way as to facilitate and simplify the production of filter cartridges.

Another important object of the invention is to provide a new and improved filter cartridge wherein resilient means are effective to hold the ends of the filter sleeve in position on the core, and a related object is to hold the ends of the filter sleeve in place by resilient means that also act, when the cartridge is put in a filter shell, to clamp the ends of the filter sleeve against opposed surfacts of the shell so as to assure effectual end-sealing of the filter sleeve.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

Figure 1:
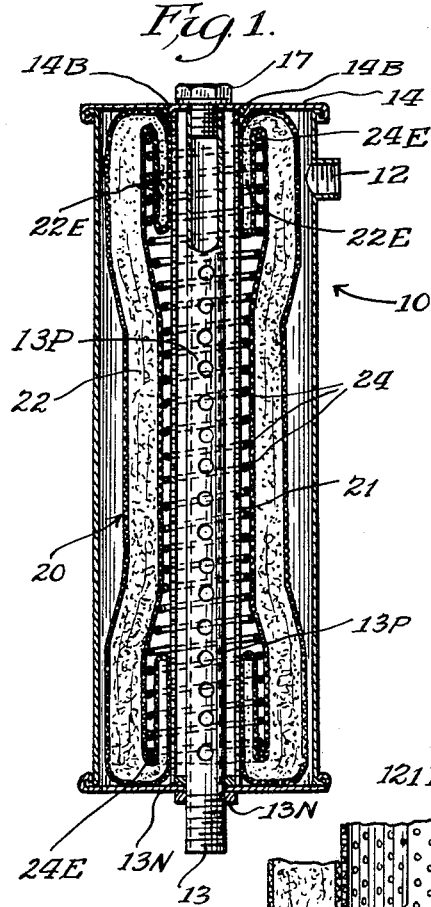
Fig. 1 is a vertical sectional view showing the new filter cartridge in its operative relation in a filter shell.

For purposes of disclosure the invention is illustrated in Fig. 1 as embodied in a single-cartridge filter 10 having a filter shell 11 of cylindrical form with a side inlet 12 and a bottom outlet 13, and having a removable cover 14 closing its open top, and the bottom outlet 13 is opposed to and spaced from the cover 14 so that a filter cartridge 20 may be inserted endwise through the top opening into endwise engagement with the bottom of the shell about the outlet 13 and may be clamped in position by the cover 14, thereby closing the upper end of the filter cartridge 20, while at the same time holding the same in place. The outlet 13 is formed by a perforated center pipe 13P which extends upwardly to substantially the level of the cover 14, and a clamping nut 17 may be extended through a central opening in the cover 14 and threaded into the pipe 13P to clamp the cover 14 and close the upper end of the pipe 13P.

The general filter organization thus described is conventional in character, and may take many different forms, and the present invention is concerned with a novel structure in the filter cartridge 20 and a novel cooperation thereof with conventional filter shell and cover structures such as those above described.

Figure 2:
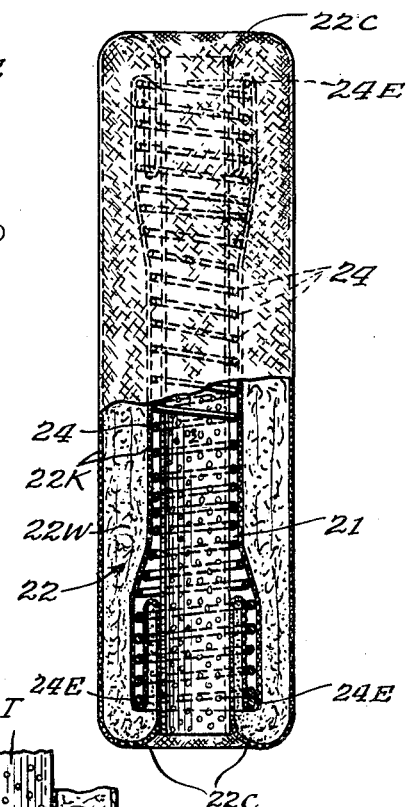
Fig. 2 is a longitudinal sectional view of a filter cartridge embodying the invention.

Thus, as illustrated in Fig. 2, the filter cartridge 20 comprises a rigid foraminous core 21 of elongated tubular form, made in this instance from perforated sheet metal, about which a fibrous filter sleeve 22 is positioned as will be described. The fibrous filter sleeve 22 may be of any conventional construction and material, such as a body or layer of waste 22W maintained in tubular form between inner and outer knitted fabric sleeves 22K, and under the present invention the filter sleeve 22 is made somewhat longer than usual so as to be substantially longer than the core 21, and the ends 22E of the sleeve 22 are reversely bent inwardly and are anchored to the core 21 by resilient means that function during separate handling of the cartridge to hold the sleeve yieldingly in position on the core 21, and which in the mounting of the cartridge 20 in a filter shell, function to yieldingly urge the reversely bent end portions of the sleeve into firmly sealed relation to the opposed surfaces of the filter shell.

In conventional filter cartridges of this general type the ends of the foraminous core are normally engaged with lateral centering means about the outlet and on the cover of the shell, and the cartridge of the present invention also provides for a similar centering cooperation as well as for end-sealing and clamping of the filter sleeve 22. Thus the core 21 is of such a length that it may cooperate with the centering means of the conventional filter shells of a particular size or design, and as shown in Fig. 1, the upper end of the core 21 cooperates with an annular centering bead 14B on the cover 14 while the lower end of the core 21 encircles the inner mounting nut 13N so as to be centered thereby.

The yielding means that are provided for retaining and end-sealing the filter sleeve 22 are provided in the cartridge 20 by a single coil spring 24 having flat or planar end coils 24E, the spring 24 having a normal length substantially greater than the length of the core 21 and having a normal diameter slightly greater than the core 21. With this arrangement the filter sleeve 22 is put in position about the spring 24, which in turn, surrounds the core 21 and the ends 22E of the sleeve 22 are reversely bent inwardly and tucked into position between the core 21 and the spring 24. The tucking operation is carried to such an extent that the bent ends of the filter sleeve 22 extend as curved surfaces 22C somewhat beyond the respective ends of the core 21. The filter sleeve 22 is maintained in this relation by the radially inward forces applied to the tucked end of the sleeve 22.

Thus, when the filter cartridge 20 is put into its position of use, the endwise clamping thereof by the cover 14 compresses the spring 24 and causes the rounded end edges 22C of the filter sleeve to be flattened into a wide area contact with the opposed surfaces. The action of the spring 24 maintains this sealing contact at the ends of the filter sleeve 20 so that bypassing of the filter sleeve is prevented.

Figure 3:
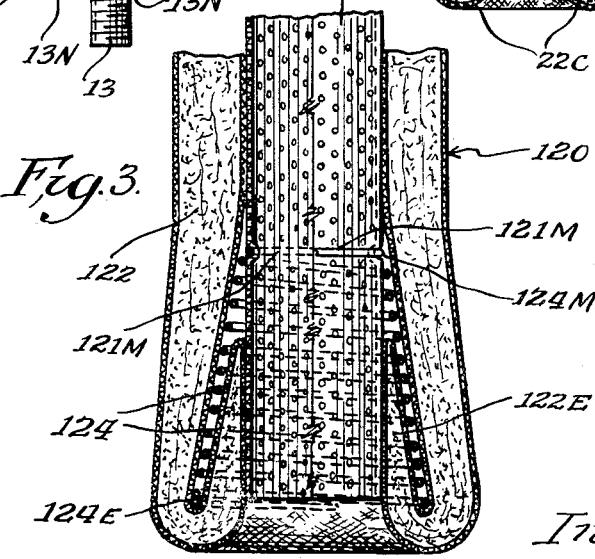
Fig. 3 is a fragmental view similar to Fig. 2 and showing the cartridge of this invention with an alternative form of core.

In Fig. 3 of the drawing an alternative form of the invention is illustrated wherein a cartridge 120 has a foraminous core 121 which has a somewhat different form of spring means associated therewith. Thus, a foraminous sheet metal core 121T is employed that has inwardly indented annular mounting grooves 121M therein that are spaced from the ends of the tube. The proportioning of the parts correspond with previously described embodiment, and a filter sleeve 122 has its ends anchored in the pockets 121P in the same manner. Thus the same advantageous end-sealing is provided when the cartridge 120 is put in its position of use. The spring means in this embodiment of the invention are provided by a pair of conical coil springs 124 (only one shown) having end coils 124M at their small ends that are of such a size that such end coils may be snapped into the respective mounting grooves 121M to securely fix the springs 124 in position on the core 121 with the larger ends 124E of the springs 124 extended toward and slightly beyond the ends of the core 121. Thus, there is an annular space between the core 121 and the large end 124E of the spring 124, and the ends 122E of the filter sleeve 122 are reversely bent inwardly and are tucked into this space. The spring 124 acts radially inwardly to clamp the inturned ends of the filter sleeve 122 against the core 121, thus to hold the sleeve in position on the core. Moreover, the springs 124 must be compressed endwise as the cartridge 120 is put into its position of use, and hence an effective end-sealing of the filter sleeve is assured.

From the foregoing description, it will be apparent that the present invention enables bypassing of the filtering media to be avoided and it will also be apparent that this is accomplished in a simple manner and in such a way that the filtering media is held in place on the core during shipment and installation.

It will also be apparent that the present invention provides an improved filter cartridge wherein the mounting of the filter sleeve on the cartridge assures that the end portions of the filter sleeve will be effectually sealed when the cartridge is put in place in a filter shell.

Thus, while I have illustrated and described but two embodiments of the invention, it will be recognized that variations may be made by those skilled in the art without departing from the scope of the invention.

I claim:

1. In a filter cartridge, a rigid foraminous tubular core, a filter sleeve surrounding the core and having end portions thereof reversely bent inwardly and disposed against the outer surface of the core to provide a double thickness of said sleeve near the ends thereof, and coil spring means between said thickness and engaging said end portions at the bends thereof to urge the reversely bent curved ends of sleeve yieldingly beyond the ends of the core.

2. A filter cartridge according to claim 1 in which said spring means clamp said reversely bent end portions radially inwardly against the core to hold the sleeve in position.

3. A filter cartridge according to claim 1 wherein said spring means provide flat end coils for applying endwise forces to the filter sleeve.

4. A filter cartridge according to claim 1 in which the spring means are in the form of a single coil spring, the opposite end portions of which act on the respective end portions of the filter sleeve.

5. A filter cartridge according to claim 1 in which the spring means are in the form of conical coil springs the small ends of which are anchored on the core near the ends thereof and the large ends of which project at least to the respective ends of the core.

6. A filter cartridge according to claim 5 in which the anchoring of the conical coil springs is accomplished by inward annular grooves in the core in which the small ends of the springs are positioned.

7. A core for a filter cartridge comprising a rigid foraminous sleeve and conical coil springs having their small ends anchored on the rigid sleeve and with their large ends projecting toward and at least to the respective ends of the rigid sleeve.

8. A core for a filter cartridge comprising a rigid foraminous sleeve and having annular grooves formed near the ends thereof, and conical coil springs with their small ends located tightly in said grooves and with their large ends projecting toward and at least to the respective ends of the rigid sleeve.

References Cited in the file of this patent

UNITED STATES PATENTS

| | | |
|---|---|---|
| 817,253 | Kneuper | Apr. 10, 1906 |
| 1,095,198 | Einch | May 5, 1914 |
| 2,168,124 | Hurn | Aug. 1, 1939 |
| 2,345,848 | Winslow et al. | Apr. 4, 1944 |
| 2,559,267 | Winslow et al. | July 3, 1951 |
| 2,751,618 | Pruitt | June 26, 1956 |

OTHER REFERENCES

"Installation Instruction for Converting Lubricating Oil Filter on General Motors #671 Diesel Engine to Full-Flow In-Line Filter," Winslow Oil Conditioners for Fuel and Lubricating Oil, Winslow Engineering Co., 4514 Hollis St., Oakland, California, received in U.S. Patent Office Nov. 29, 1941; 40 sheets; the portion cited and relied on is about sheet 16.